July 23, 1957     G. A. PETTINE     2,800,550
WARNING SIGNAL FOR HYDRAULIC BRAKES
Filed July 16, 1956

*INVENTOR.*
GIUSEPPE A. PETTINE
BY
*William Frederick Werner.*
ATTORNEY

2,800,550
WARNING SIGNAL FOR HYDRAULIC BRAKES

Giuseppe A. Pettine, Providence, R. I.

Application July 16, 1956, Serial No. 597,990

2 Claims. (Cl. 200—84)

This invention relates to new and useful improvements in warning signals for hydraulic brakes of motor vehicles to indicate a dangerously low level of brake fluid in the master cylinder of the brakes.

An important object of the invention is to provide an electrical signaling device, which in its association with the master cylinder will automatically warn the driver of the vehicle when the fluid in the master cylinder falls to a dangerous operating level.

Another object of the present invention is to provide a warning signal for hydraulic brakes which is of simple and practical construction, efficient and reliable in operation, relatively inexpensive to manufacture, and otherwise well adapted for the purpose for which it is intended.

Still another object of the present invention is to provide visible or audible means or both to the driver of a motor vehicle to warn him of brake inefficiency before an emergency condition arises so that loss of life and property damage resulting from automotive accidents caused through brake failure may be avoided.

Other objects of the present invention will become apparent in part and be pointed out in part in the following specification and claims:

Motor vehicles especially trucks are subject to vibration and shaking. Due in part to road conditions and in part to the inherent operation of the vehicle itself. In addition brake fluids are corrosive. In the past warning signals for hydraulic brake systems failed to provide for protection of the working parts against corrosion or the several parts becoming maladjusted through vibration. In addition the constructions were costly to manufacture. The present invention obviates these undesirable conditions.

Like reference characters refer to like parts in the accompanying drawings, in which.

Figure 1:
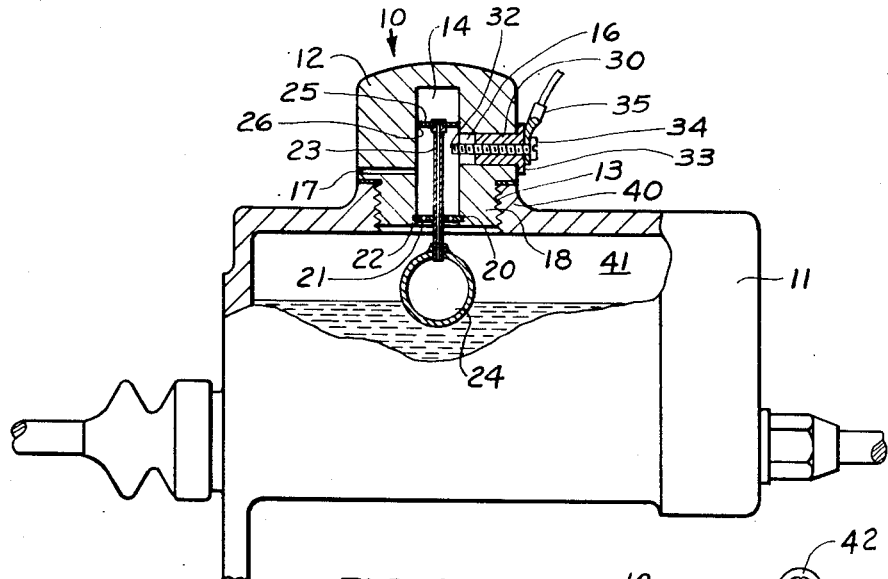
Figure 1 is a side elevational view, partly in section, showing the master cylinder of a hydraulic brake system with the present invention attached to the master cylinder.

Referring in detail to the drawings, reference character 10 generally indicates the new and improved warning signal unit attached to the master cylinder 11 of a hydraulic brake system.

Figure 4:
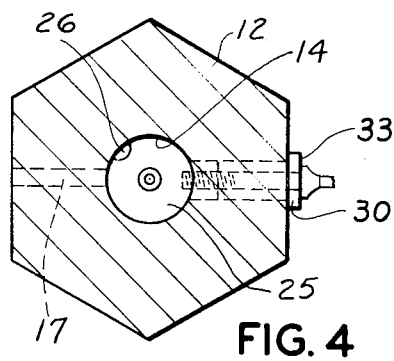
Figure 4 is a horizontal cross sectional view taken along line 4—4 of Figure 3.

A cap or dome 12 is provided which may be of any geometrical shape but which is illustrated as being hexagonal (see Figure 4) to facilitate the fastening of dome 12 to master cylinder 11 through a threaded connection 13.

Dome 12 is provided with an axial core 14. Two transverse bores are provided. One bore 16 extends through one side to core 14. The other bore extends from another side to core 14 and is a ventilating aperture 17. It is located below bore 16 so that brake fluid which may inadvertently be displaced into core 14 will be discharged through aperture 17 before the fluid reaches the level of bore 16.

Dome 12 is provided with a reduced portion 18 having male threads 19. A splash pan 20 provided with a plurality of orifices 21 is secured in the wall surrounding core 14 by means of swedging the edge of reduced portion 18 at 22. Splash pan 20 thus becomes a ventilated plug and guide in bore 14 for purposes which will presently appear.

A hollow shaft 23 is reciprocally mounted in disk 20. A float 24 is secured on one end of hollow shaft 23. A plate 25 provided with a cut out or relief portion 26 is fixed to the other end of hollow shaft 23. Plate 25 may be fixed to hollow shaft 23 as by welding or as illustrated in the several views, hollow shaft 23 may be swedged to form a rivet typed fastening means. Plate 25 is guided in its up and down movement by the walls of bore 14. Relief 26 is provided to prevent a partial vacuum from being created between plate 25 and the bottom of bore 14. Such partial vacuum would interfere with the free up and down movement of plate 25 and consequently hinder the free flotation of float 24.

It will be noted that float 24 is vented through hollow shaft 23. This feature is important as experience has taught that most floats after a period of use absorb the brake fluid. The hollow shaft permits this fluid to evaporate before it can accumulate to an appreciable amount sufficient to interfere with the free flotation function of the float 24.

A bushing 30 of insulating material having resilient properties such as neoprene is secured in bore 16. The bushing 30 is preferably T shaped to provide an electrically insulated face 33. A screw 34 of electrically conductive material is screwed axially into bushing 30. This action expands bushing 30 to assist in securing bushing 30 in transverse bore 16. Bushing 30 is shorter in length than transverse bore 16 so that bushing 30 does not project into axial core 14. Screw 34 does project into axial core 14 so that plate 25 may make electrical contact with screw 34. The engagement and disengagement of plate 25 with screw 34 is an electrical switch function of opening and closing an electrical circuit. An electric wire 35 is secured between the head of screw 34 and electrically insulated face 33.

It is contemplated that float 24, hollow shaft 23, splash pan 20 and plate 25 may be silver plated with a non-corrosive coating. These parts are small in size and light in weight to provide a minimum cost of manufacturing and assembling while providing a construction undaunted through vibration.

Master cylinder 11 now provided with a threaded hollow boss 40 to permit brake fluid to be poured into chamber 41 is in condition to naturally receive screw threads 19 to form a fluid tight thread connection 13 with warning unit signal 10.

Figures 2, 5:
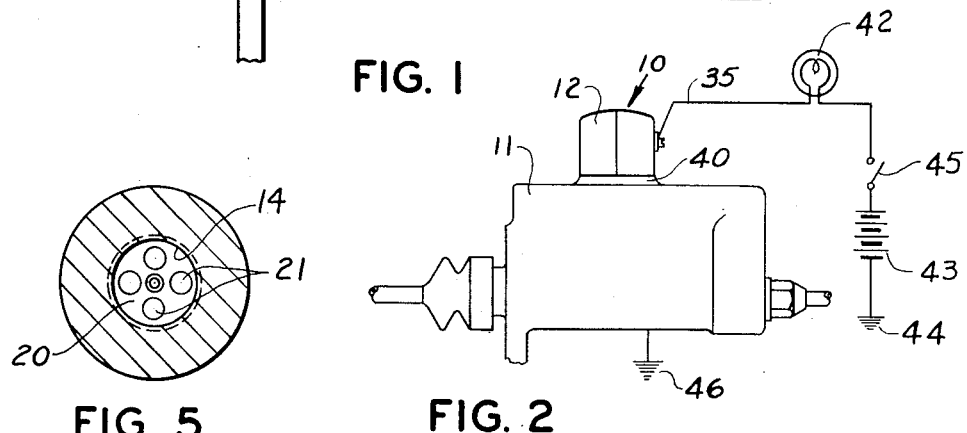
Figure 2 is a side elevational view similar to Figure 1 showing the electrical connections of the present invention in diagramatic form.
Figure 5 is a horizontal cross sectional view taken along line 5—5 of Figure 3.

A warning signal visible or audible and illustrated as light bulb 42 is provided as attached to wire 35. The conventional motor vehicle battery 43 is shown in Figure 2 as having a ground 44 and as being connected to ignition switch 45 which connects battery 43 with light bulb 42. Master cylinder 11 is grounded as at 46.

Figure 3:
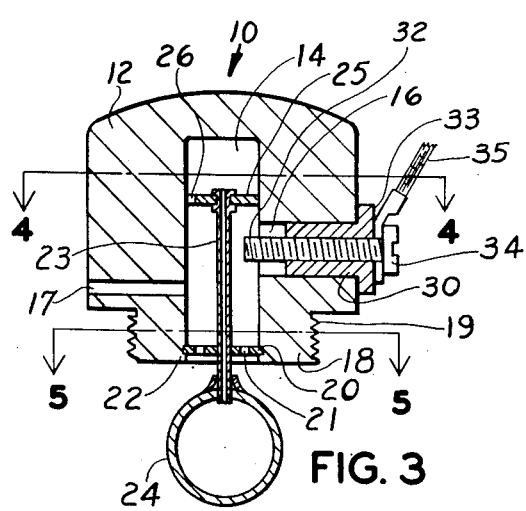
Figure 3 is an enlarged transverse cross sectional view of the mechanical portion of the present invention.

It will be observed from Figures 1 and 3 that the new and improved warning signal 10 is a small, compact, light weight, non-corrosive unit which is readily attached to a conventional master cylinder 11. Its ease of packaging and shipping is self evident.

In operation float 24 will engage the fluid in chamber 21 after warning signal 10 is attached to master cylinder 11 through threaded connection 13. So long as the fluid in chamber 21 remains at a predetermined level, float 24 through hollow shaft 23 will position plate 25 above and out of contact with screw 34. Just as soon as the brake fluid in chamber 21, falls below a predetermined level, float 24 will permit plate 25 to contact screw 34 and thereby complete the electrical circuit so that a warning signal such as light bulb 42 is electrically energized. Switch 45 is a safety factor which permits the electrical circuit to be cut off when the motor vehicle is not in use. The switch 45 is contemplated to be the ignition switch on a motor vehicle, so that, as soon as the ignition switch is turned on the operator will be warned if the brake fluid is at a dangerously low level. With ignition switch 45 closed it is evident that wire 35 is connected to a second switch consisting of plate 25 and screw 34 which also must be closed, plate 25 contacting screw 34, to complete the electrical circuit through ground 46 to electrically energize light bulb 42 or its warning signal equivalent.

Having shown and described a preferred embodiment of the present invention, by way of example, but realizing that structural changes could be made and other examples given without departing from either the spirit or scope of this invention, what I claim is:

1. In combination with a master cylinder for hydraulic brakes having a chamber, a brake fluid supply in said chamber, an opening in the upper side of said master cylinder leading to said chamber, a warning signal consisting of a dome of electrically conductive material provided with an axial core secured in said opening, said axial core providing an extension to said chamber, two transverse bores in said dome, one transverse bore located below the lowest point of the second transverse bore to vent said axial core of brake fluid, a bushing of resilient electrical insulating material secured in said second transverse bore, a screw of electrically conductive material secured in said bushing, a splash pan provided with a plurality of orifices secured in the base of said axial core at the juncture of said axial core and said chamber, a hollow shaft reciprocally mounted in one of said orifices, a float secured to one end of said hollow shaft floating in said brake fluid, said hollow shaft venting said float, a plate provided with a peripheral recess, secured to the other end of said hollow shaft, said plate slidingly engaging said axial core, an electrical circuit having a signalling element, said dome and said screw being adapted for connection in said electrical circuit, said plate and said screw forming a switch in said circuit, said brake fluid maintaining said float and said plate in an elevated position above said screw in open circuit position, said brake fluid upon a predetermined loss of brake fluid lowering said float and said plate in circuit closing position upon engagement of said plate with said screw.

2. In combination with a master cylinder for hydraulic brakes having a chamber, a brake fluid supply in said chamber and an opening in the upper side of said master cylinder leading to said chamber, a warning signal consisting of a dome provided with an axial core secured in said opening, said axial core providing an extension of said chamber, two transverse bores in said dome, one transverse bore located below the lowest point of the other transverse bore to vent said axial core of brake fluid, a bushing of resilient electrical insulating material having a T shape, secured in the other of said two transverse bores, a screw of electrically conductive material provided with a head, secured in said bushing, a splash pan provided with a plurality of orifices, secured in the base of said axial core at the juncture of said axial core and chamber, a hollow shaft reciprocally mounted in one of said orifices, a float having properties of flotation in said brake fluid secured to one end of said hollow shaft and floating in said brake fluid, a plate provided with a recess secured to the other end of said shaft, said plate slidingly engaging said axial core, an electrical circuit consisting of a storage battery having a ground connection, said dome having a ground connection, an electrical switch and a warning signal, an electrical connection between one side of said switch and said storage battery, a second electrical connection between the other side of said switch and one side of said warning signal, a third electrical connection between the other side of said warning signal and the head of said screw, the fluid level of said brake fluid in said chamber positioning said float to cause engagement of said plate with said screw through said hollow shaft to complete the electrical circuit to electrically energize said warning signal.

No references cited.